(12) United States Patent
Novacoski et al.

(10) Patent No.: US 6,398,423 B1
(45) Date of Patent: Jun. 4, 2002

(54) OPTIC FIBER RETAINING SYSTEM (75) Inventors: James Edward Novacoski, Yucaipa; Can Trong Nguyen, Garden Grove, both of CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/464,643

(22) Filed: Dec. 15, 1999

(51) Int. Cl.⁷ .................................................. G02B 6/36
(52) U.S. Cl. ............................. 385/78; 385/53; 385/55; 385/76; 385/77
(58) Field of Search ............................ 395/53, 55, 58, 395/60, 76, 77, 78

(56) References Cited

U.S. PATENT DOCUMENTS

| | | | |
|---|---|---|---|
| 4,167,303 A | 9/1979 | Bowen et al. | 350/96.21 |
| 4,178,068 A | 12/1979 | Hoover | 350/96.21 |
| 4,373,777 A | 2/1983 | Borsuk et al. | 350/96.2 |
| 4,516,829 A | 5/1985 | Borsuk et al. | 350/96.2 |
| 4,579,418 A | 4/1986 | Parchet et al. | 350/96.2 |
| 4,611,887 A | 9/1986 | Glover et al. | 350/96.21 |
| 4,657,340 A | 4/1987 | Tanaka et al. | 350/96.21 |
| 4,687,291 A | 8/1987 | Stape et al. | 350/96.21 |
| 4,738,508 A | 4/1988 | Palmquist | 350/96.21 |
| 4,793,683 A | 12/1988 | Cannon, Jr. et al. | 350/96.21 |
| 4,898,446 A | 2/1990 | Hinckley | 350/96.2 |
| 5,076,656 A | 12/1991 | Briggs et al. | 385/71 |
| 5,096,276 A | 3/1992 | Gerace et al. | 385/76 |
| 5,101,463 A | 3/1992 | Cubukciyan et al. | 385/72 |
| 5,129,023 A | 7/1992 | Anderson et al. | 385/70 |
| 5,131,063 A | 7/1992 | Monroe et al. | 385/78 |
| 5,146,525 A | 9/1992 | Tabone | 385/78 |
| 5,157,749 A | 10/1992 | Briggs et al. | 385/60 |
| 5,212,752 A | 5/1993 | Stephenson et al. | 385/78 |
| 5,212,753 A | 5/1993 | Maranto | 385/80 |
| 5,214,731 A | 5/1993 | Chang et al. | 385/69 |
| 5,245,683 A | 9/1993 | Belenkiy et al. | 385/72 |
| 5,245,684 A * | 9/1993 | Terao et al. | 385/78 |
| 5,253,316 A | 10/1993 | Shibutani et al. | 385/78 |
| 5,265,181 A | 11/1993 | Chang | 385/75 |
| 5,283,848 A | 2/1994 | Abendschein et al. | 385/59 |
| 5,285,510 A | 2/1994 | Slaney | 385/78 |
| 5,311,609 A | 5/1994 | Abe | 385/60 |
| 5,363,459 A | 11/1994 | Hultermans | 385/60 |
| 5,396,572 A | 3/1995 | Bradley et al. | 385/78 |
| 5,590,229 A | 12/1996 | Goldman et al. | 385/59 |
| 5,619,610 A | 4/1997 | King et al. | 385/139 |
| 5,633,970 A | 5/1997 | Olson et al. | 385/78 |
| 5,682,451 A | 10/1997 | Lee et al. | 385/78 |
| 5,712,938 A | 1/1998 | Lin et al. | 385/59 |
| 5,717,802 A | 2/1998 | Briggs et al. | 385/75 |
| 5,727,101 A | 3/1998 | Giebel et al. | 385/59 |
| 5,946,436 A * | 8/1999 | Takashi | 385/60 |

FOREIGN PATENT DOCUMENTS

| | | | | |
|---|---|---|---|---|
| DE | 4041425 | * | 7/1992 | 385/53 |
| JP | 1-186906 | | 1/1988 | |

* cited by examiner

*Primary Examiner*—Rodney Bovernick
*Assistant Examiner*—Sung Pak
(74) *Attorney, Agent, or Firm*—Roger C. Turner

(57) ABSTRACT

An optical fiber connector is provided with a frame mount (182) having a passage (200) and a terminus (164) which extends through the passage to position an optical fiber (72) that extends through bores in the terminus, which enables the adjustment of terminus position for optimal coupling of the fiber tip (20) to the tip (22) of a fiber of a mating connector. The terminus has a pair of projections (220, 222) and the walls of the passage have a plurality of recesses to fix the rotational position of the terminus at any of a plurality of rotational positions. The terminus is accurately oriented so its axis extends in a desired direction, by forming a largely forwardly-facing conical surface (214) in the terminus and a corresponding rearwardly-facing conical surface (204) in the walls of the passage, the conical surfaces serving to accurately position the terminus.

4 Claims, 7 Drawing Sheets

OPTIC FIBER RETAINING SYSTEM

BACKGROUND OF THE INVENTION

An optical fiber connector can include a frame with one or more termini mounted on the frame, with each terminus having bores through which an optical fiber extends, and with the tip of the fiber lying at the tip of a ferrule of the terminus. The tips of two fibers are connected by pressing the tips of the ferrules against each other, with at least one of the termini being spring loaded for this purpose. When the optic fiber is fixed in the ferrule, as with epoxy, the tip of the ferrule with the fiber tip thereat is commonly ground and lapped, with the tip of the ferrule being convexly curved to assure that the fiber tips will abut. However, inaccuracies in forming the convex surfaces can cause a gap between portions of the abutting fiber tips. In order for a high proportion of light to pass from one fiber to the other, only small microscopic gaps can exist between any portions of the abutting fiber tips. A connector that minimizes such microscopic gaps, would be of value.

When a pair of connectors mate, the front end of one of the ferrules enters an aligning sleeve surrounding the other ferrule, the aligning sleeve assuring that the ferrule tips are precisely concentric. Such projection of a ferrule and into an aligning sleeve, occurs every time a pair of connectors are mated. It is desirable that the rear portions of the termini whose ferrules must enter aligning sleeves of another connector, be accurately positioned. This minimizes forces on the front of the ferrule to align it with the alignment sleeve as the connectors mate. An optic fiber connector which accurately positioned and oriented the rear portion of its termini so the ferrules at the front of the termini easily entered the alignment sleeves of the other connector, in a simple construction, would be of value.

SUMMARY OF THE INVENTION

In accordance with one embodiment of the present invention, an optical fiber connector is provided which enables adjustment of the orientations of its termini to obtain maximum transfer of light between the connector and a mating connector, and to initially orient its termini so the ferrules of the front ends of its termini easily enter alignment sleeves of the mating connector. The rear of each terminus lies in a passage of a connector frame mount, with the terminus and passage having engaging walls that abut to prevent terminus rotation about the axis of the terminus, at each of a plurality of different rotational positions that are angled about the axis of the terminus. However, the body can be moved to a release position where it can be rotated from one rotational position to another, and then moved back to the locked position where its rotational position is maintained. The efficiency of light transfer can be monitored as the terminus is moved from a locked position to a release position, turned, and moved back to a new lock position, until an optimum lock position is reached, where there is maximum coupling of light between the tips of the two optical fibers.

The axis of each terminus can be oriented parallel to and in line with the axis of the passage that it lies in, by forming conical surfaces on the terminus and on the walls of a passage in a frame mount through which the terminus extends. A spring presses the conical surfaces against one another. The conical surfaces accurately align the terminus so the front end of its ferrule will readily enter an aligning sleeve of a mating connector.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
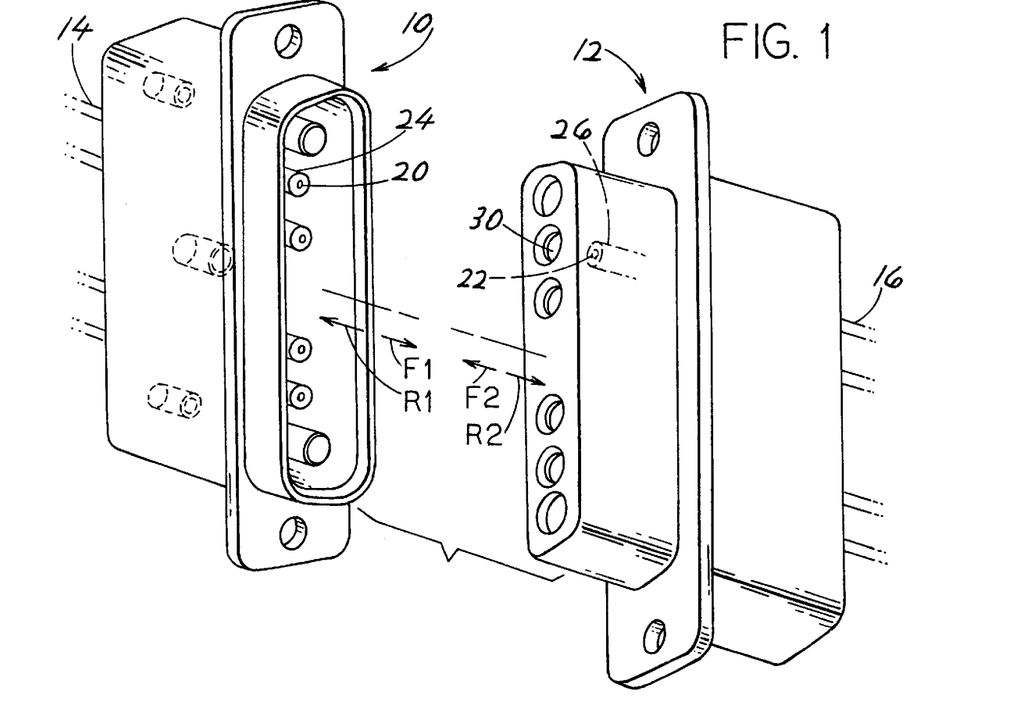
FIG. 1 is an exploded view of first and second connectors constructed in accordance with a first embodiment of the invention.
Figure 2:
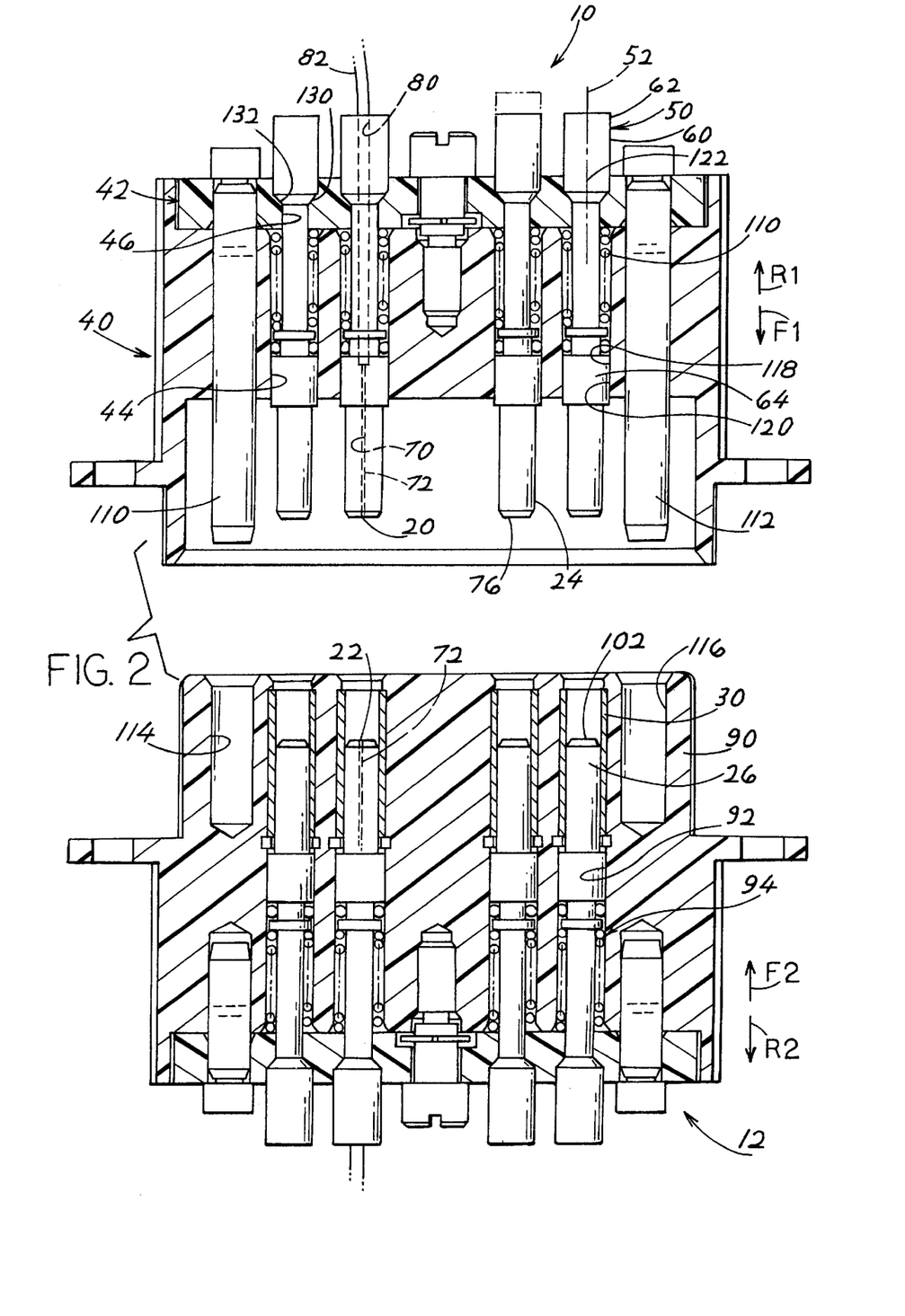
FIG. 2 is a sectional exploded view of the connectors of FIG. 1.

FIG. 1 shows a pair of optical fiber connectors 10, 12 that each holds optical fiber cables 14, 16 that each has a fiber tip 20, 22. When the connectors mate, ferrules 24 of the first connector have their tips pressed against ferrules 26 of the second connector. The ferrules 24 of the first connector are inserted into alignment sleeves 30 of the second connector, where the ferrules 26 lie, so the ferrule tips accurately abut one another thereby causing the fiber tips 20, 22 to abut one another. As shown in FIG. 2, the first connector 10 has a frame 40 with a frame mount 42. The first frame of the first connector has passages 44 with rear portions of the passages forming passages 46 in the mount 42. A terminus 50 lies in each passage. Each terminus has an axis 52 that extends in front and rear directions, and each terminus lies in one of the frame passages 44 and one of the mount passages 46. Front and rear directions F1, R1 are designated for the first connector 10, while corresponding front and rear directions F2, R2 are designated for the second connector 12.

Each terminus 50 includes a body 60 with a body rear end portion 62 that extends through a mount passage 46, and with a body front end portion 64 that holds a ferrule 24. Each ferrule has a small diameter bore 70 through which an optical fiber 72 extends, with the fiber tip 20 lying even, or flush, with the ferrule front tip 76. It is common to provide a larger diameter bore 80 extending along the rear portion of the terminus, through which the optic cable with its jacket 82 extends. Epoxy in the bores holds the cable jacket and the front portion of the fiber in place. The second connector has a second frame 90 with passages 92 that hold termini 94. Their termini 94 are preferably identical with the termini 50 of the first connector. However, the second connector has alignment sleeves 30 at the front of each of its passages. When the connectors mate, the front end of a first ferrule 24 of the first connector enters an alignment sleeve 30 of the second connector. When fully mated, the tips 76, 102 of the ferrules 24, 26 abut, and their fiber tips 20, 22 abut. Each terminus 50 of the first connector holds a spring 110 that allows the terminus to be pushed rearwardly R1 slightly when the connectors mate, to assure that the tips of the ferrules and fibers abut one another.

When a ferrule 24 of the first connector enters an alignment sleeve 30 of the second connector, the ferrule 24 is usually pushed slightly to one side as it enters the alignment sleeve 30. The two ferrules 24, 26 lie very closely within the alignment sleeve, with the tolerances in the diameters of the inside of the sleeve and the outsides of the ferrules typically being half of a thousandth inch (about 0.01 mm). A pair of alignment pins 110, 112 enter alignment holes 114, 116 of the second connector to align the connectors. However, a body front end portion 64 is commonly not precisely held within the passage portion 118 around it, to allow the tip of the ferrule to shift slightly so as to lie within the alignment sleeve. Instead, accurate positioning and orientation of the terminus 50 is accomplished at the mount passage 46.

Figure 3:
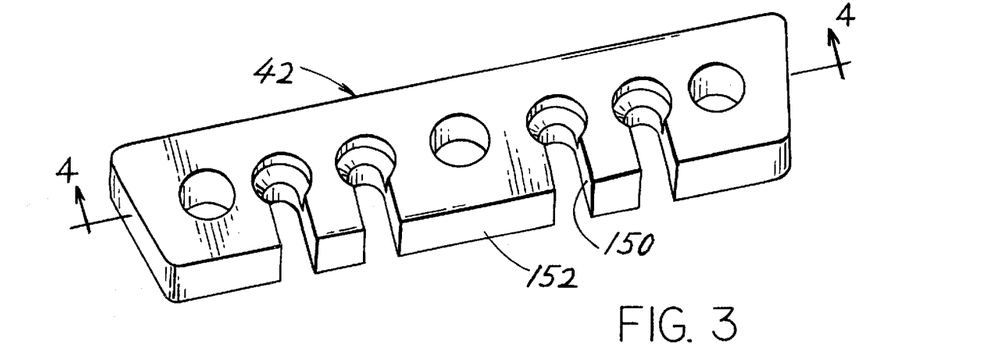
FIG. 3 is an isometric view of a mount of a frame of one of the connectors of FIG. 2.
Figure 4:
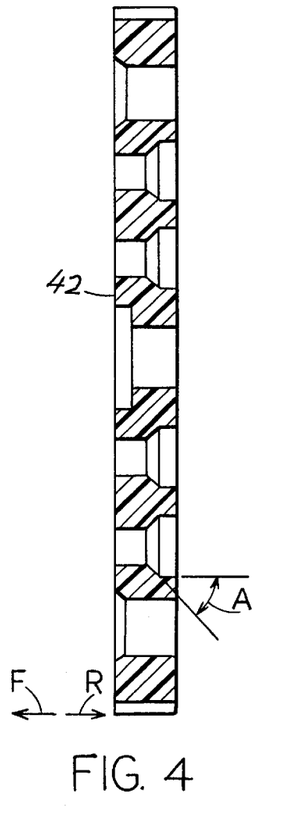
FIG. 4 is a sectional view of the mount of FIG. 3, taken on line 4—4 thereof.
Figure 5:
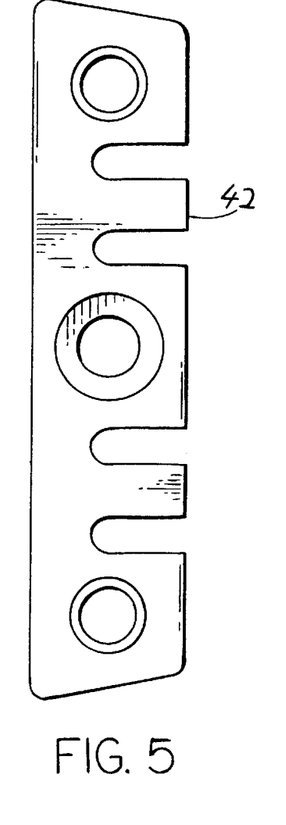
FIG. 5 is a front elevation view of the mount of FIG. 4.
Figure 6:
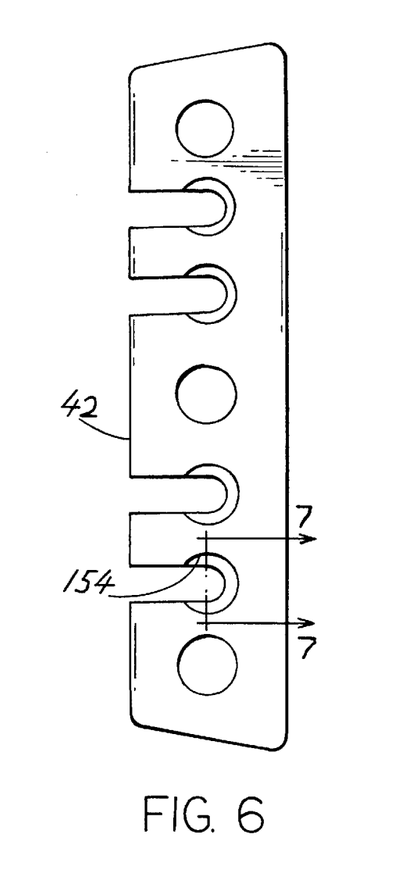
FIG. 6 is a rear elevation view of the mount of FIG. 4.
Figures 7, 9:
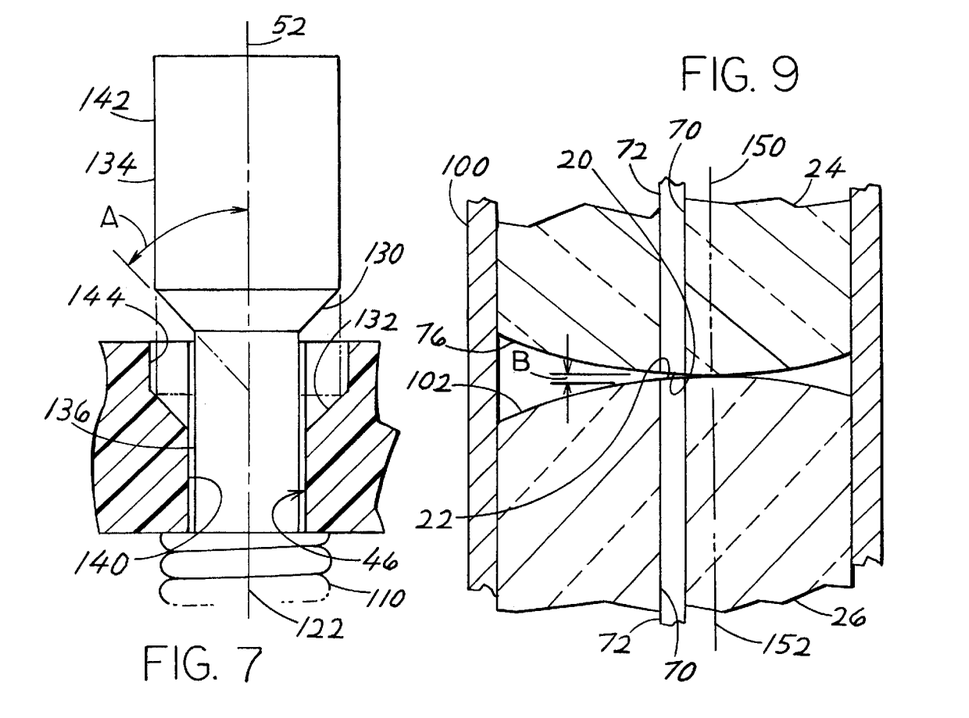
FIG. 7 is a view taken on line 7—7 of FIG. 6, and showing the rear portion of a terminus therein, with the terminus lying in a release position.
FIG. 9 is an enlarged sectional view of the front ends of a pair of termini of FIG. 2, shown fully mated, with FIG. 9 showing an exaggerated error in the convex mating surfaces.

Alignment of the terminus axis 52 with the passage axis 122 is achieved by providing conical abutting surfaces 130, 132 on the body rear portion 62 and on the walls of the mount passage 46. As shown in FIG. 7, the body rear portion has an enlargement 134 that forms the conical surface 130 and has a neck 136 that extends through a narrow part 140 of the mount passage 46. There is a clearance between the neck 136 and narrow part 140 of the passage, and between a cylindrical surface 142 of the enlargement and a largely cylindrical surface 144 at the rear portion of the passage 46. This allows slight sideward shifting of the terminus to assure that the conical surfaces 130, 132 abut one anther. The spring 110 assures that the surfaces will abut. The conical surfaces preferably form an angle A of 45° with the terminus and passage axes 52, 122. The angle A should be between 15° and 75°, to assure that friction does not prevent terminus movement that keeps the conical surfaces in facewise contact and to enable the terminus to be easily moved rearwardly out of the passage when desired. Applicant constructs each surface so the angle of 45° is accurate within ½° to provide surface contact. Each terminus can be removed by compressing the spring 110 and moving the terminus along a laterally-extending slot 150 (FIG. 3) to the edge 152 of the mount. Until then, a barrier 154 (FIG. 6) prevents removal of the terminus. The mount 42 of the frame is preferably separate from the rest of the frame so the termini can be installed on the mount, with the mount then installed on the rest of the frame.

Although the conical surfaces orient the ferrules 24 (FIG. 2) so they readily enter the alignment sleeves 30 during mating, the termini can tilt slightly to allow the terminus to fully enter the sleeve.

Figure 10:
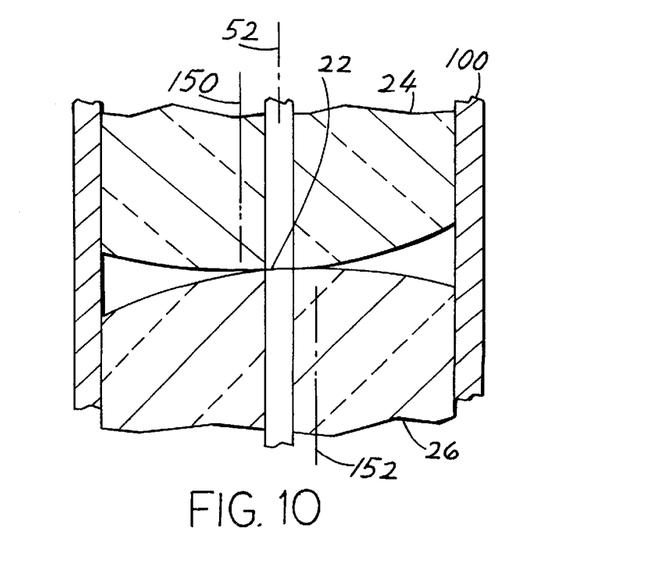
FIG. 10 is a view similar to FIG. 9, but with one of the termini rotated 180° from the position of FIG. 9.

FIGS. 9 and 10 illustrate a situation that gives rise to poor light coupling between the tips 20, 22 of a pair of fibers that are intended to be connected so almost all light passes between the fibers. It is common practice to use epoxy to fix each fiber to the walls of the bore 70 of the corresponding ferrule, with the tip of the fiber initially projecting slightly beyond the tip of the ferrule. Then the ferrule with the fiber therein, is ground and polished with a convex curvature as shown in FIG. 9. The convex surfaces are intended to be coaxial with the axes of the bores 70. However, it is found that in practice, the centers of convexity are often slightly shifted from the axes of the bores and therefore of the fibers 72. In FIG. 9, the axes of convexity 150, 152 of the two ferrules and fiber tips are aligned. This is a worst case scenario, because this results in the convex surfaces touching along their axes of convexity 150, 152, leaving a relatively large gap B at one side of the fibers. The polished tips of the fibers must lie very close in order for high efficiency transfer of light between them. A large gap B results in considerable loss of light.

FIG. 10 shows the ferrules 24, 26 positioned with the first ferrule 24 turned 180° so its axis of convexity 150 lies on the opposite side of axis 52 from the axis of convexity 152 of the second ferrule. This results in the fiber tips 20, 26 engaging one another along the axis 52 of the sleeve 100 and of the fiber tips. The result is a minimum gap between the tips of the fibers. The largest thickness of the gap is at the periphery of the fibers, where the thickness of the gap is a small fraction of the thickness B of FIG. 8. Thus, the ability to rotate one of the ferrules such as 24 to different angular positions with respect to the other ferrule 26, can result in appreciable increase in light transfer between the coupled fibers. As mentioned in the description of FIG. 9, the error, or distance of offset of the axis of convexity 150, 152 from the fiber axes at 52, are exaggerated.

Figure 8:
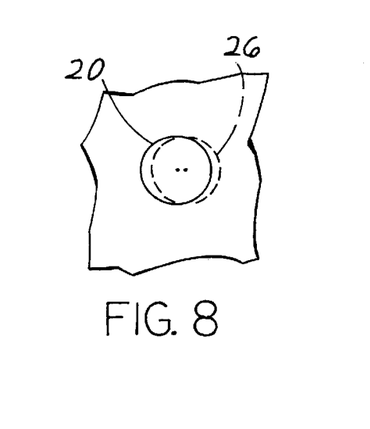
FIG. 8 is a plan view of the tip of one of the ferrules of FIG. 8, with the position of the optical fiber of the other ferrule indicated in phantom lines.

FIG. 8 shows another phenomenon, where the fiber tips 20, 22 are not precisely concentric. In many cases, better alignment of the tips can be achieved by turning one of the ferrules. It should be noted however, that in most cases the fibers are precisely aligned so that only a small increase in light transfer is usually obtained when one of the ferrules is turned to a different position, the increase usually being much less than the increase that can be obtained as a result of errors in axis of convexity indicated in FIG. 9 and 10.

Figure 11:
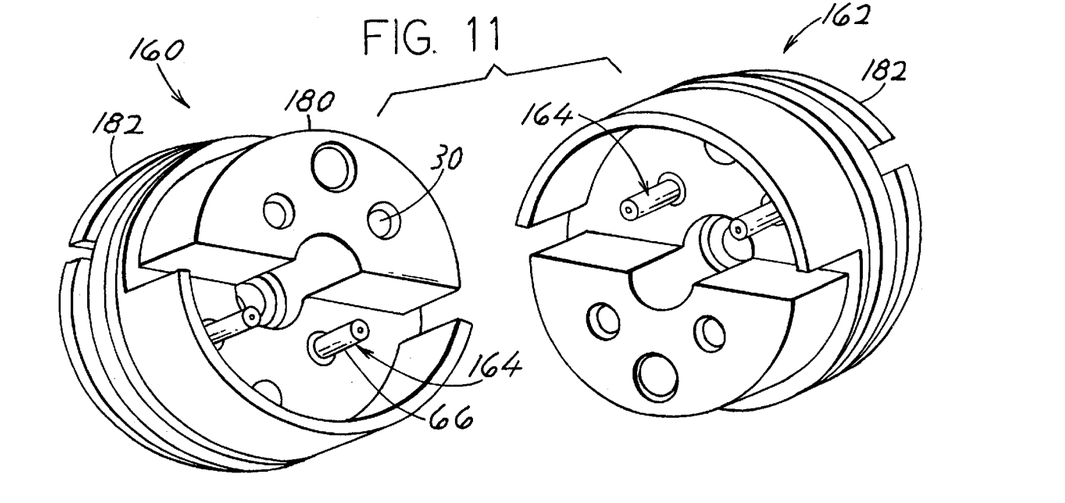
FIG. 11 is an exploded isometric view of a pair of optical fiber connectors of a second embodiment of the invention.
Figure 12:
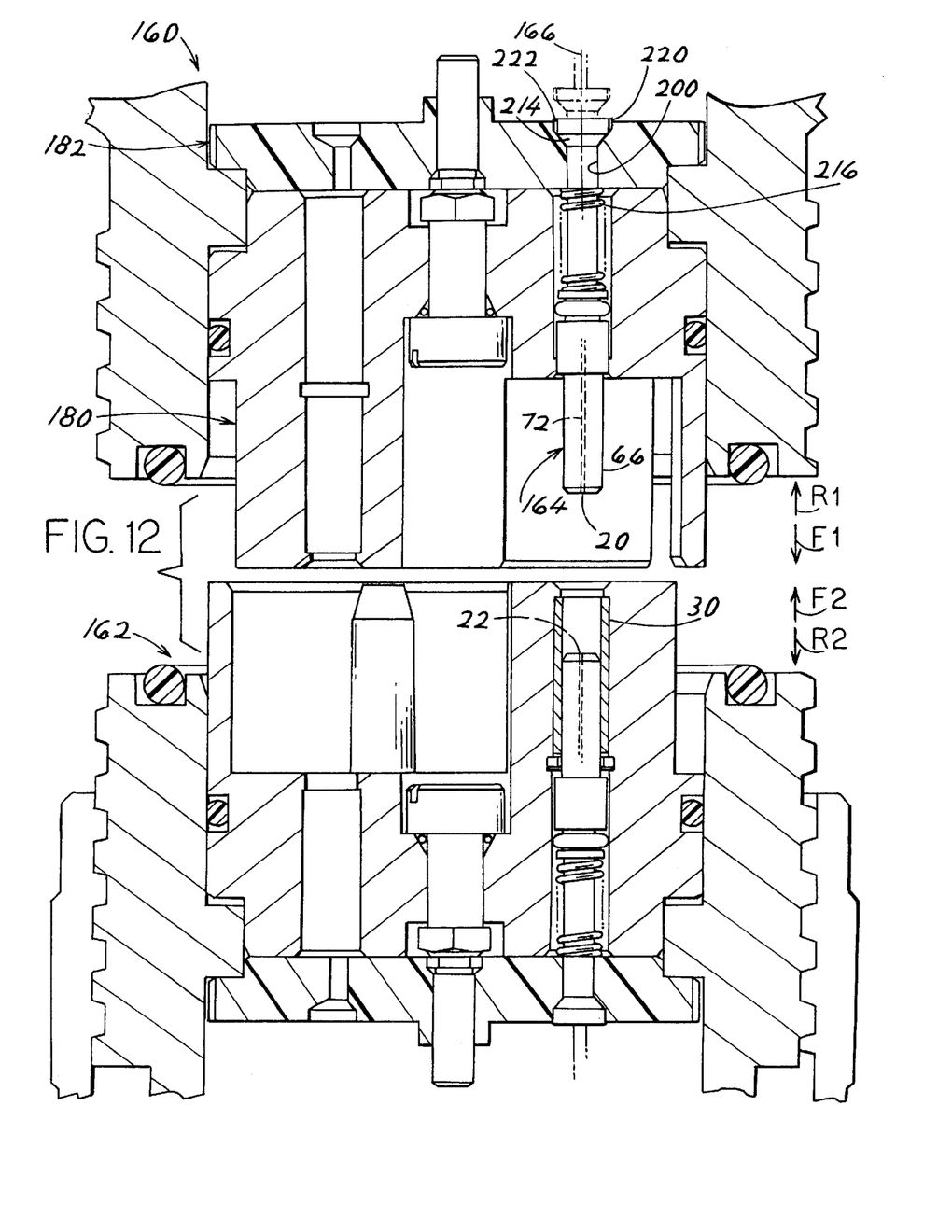
FIG. 12 is an exploded sectional view of the connectors of FIG. 11.

FIG. 12 shows a pair of connectors 160, 162 that are constructed so a terminus 164 of one of the connectors can be turned to different rotational positions about its axis 166. Each of the connectors is of the type shown in FIG. 11, where the two connectors are identical and are hermaphroditic in that two identical connectors can mate to one another. For half of the termini 164 of each connector, the ferrule 66 is exposed, and for the other half of the termini the ferrule lies in an alignment sleeve 30. Each connector has a frame 180 with a mount 182 at which the termini are mounted, with each terminus projecting at least partially through a passage of the mount.

Figures 13, 14, 15, 16, 17:
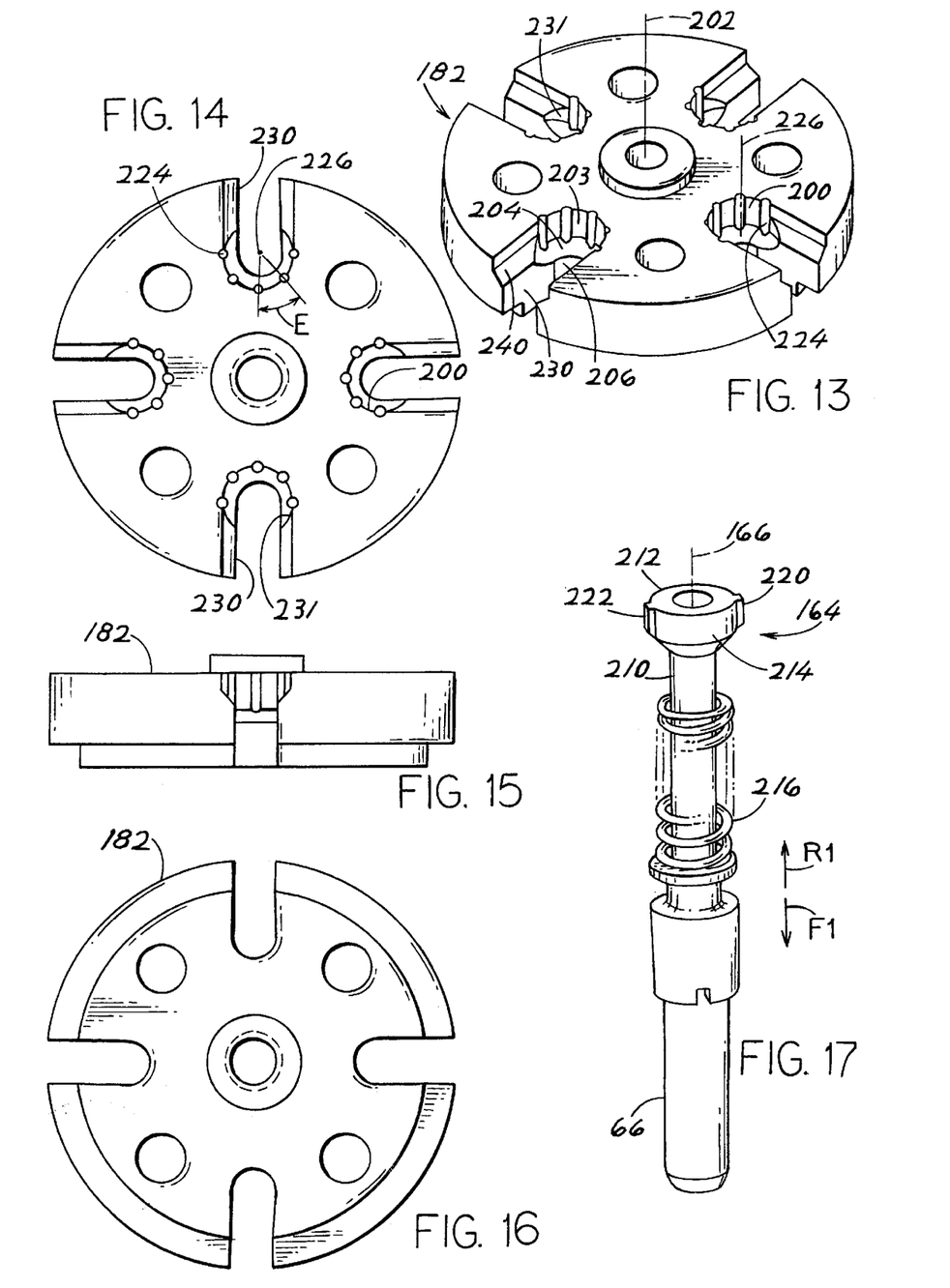
FIG. 13 is a rear isometric view of the frame mount of the first connector of FIG. 12.
FIG. 14 is a rear elevation view of the mount of FIG. 14.
FIG. 15 is a side elevation view of the mount of FIG. 14.
FIG. 16 is a front elevation view of the mount of FIG. 13.
FIG. 17 is an isometric view of a terminus of the connectors of FIG. 12.

As shown in FIG. 13, the particular mount illustrated 182 has four identical passages 200 that are spaced 90° apart about the center 202 of the mount. Each passage has a large diameter cylindrical portion 203, a mount conical surface 204, and a small diameter cylindrical surface 206. The terminus 164 shown in FIG. 17, includes a body 210 with a rear portion, or nesting portion 212 having a body cylindrical surface 214 that lies facewise against the mount cylindrical surface 203. A helical spring 216 presses the body and ferrule forwardly F1, which assures that the cylindrical surfaces 204, 214 lie facewise against one another.

In accordance with the present invention, the terminus and mount are formed so the terminus can be moved to different rotational positions about its axis 166 to achieve optimum light coupling between a pair of coupled fibers. The terminus nesting portion has a pair of projections 220, 222. The large cylindrical part 203 of the mount passage has a plurality of recesses 224 spaced about the axis 226 of the passage, which is aligned with the axis of the terminus. FIG. 14 shows that in the particular connector illustrated, there are five recesses 224 spaced apart by an angle F of 45°. If there were a complete circle of recesses spaced by 45°, there would be a total of eight recesses. However, three recesses are left out because of a slot 230 that is provided to enable installation and removal of a terminus from the mount. A shoulder 231 forms a barrier that prevents terminus movement along the slot 230 in the locked position. When the terminus is installed in a passage 200, the terminus can be locked in any one of eight rotational positions. There will always be at least one projection 220, 222 lying in one of the recesses 224 to fix the rotational position of the terminus.

Figures 18, 19, 20, 21:
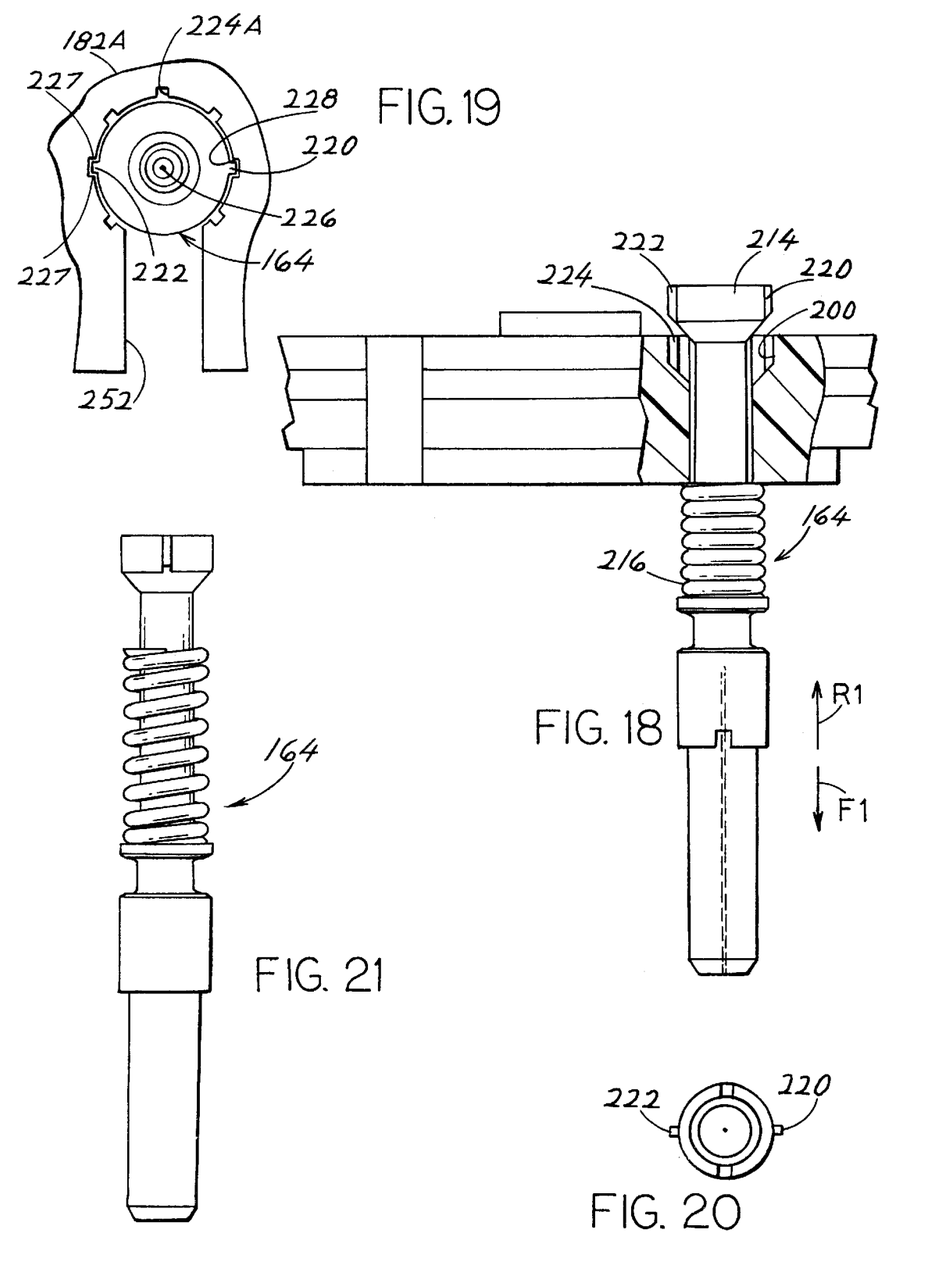
FIG. 18 is a partially sectional view of the mount of FIG. 13, with the terminus of FIG. 17 installed and with the terminus moved rearwardly to a release position.
FIG. 19 is a rear elevation view of a portion of the mount and terminus of FIG. 18.
FIG. 20 is a front elevation view of the terminus of FIG. 18.
FIG. 21 is a side elevation view of the terminus of FIG. 17.

FIG. 19 shows the terminus 164 in a slightly modified mount 182A with seven recesses 224A spaced apart about the passage axis 226. Each terminus projection has a pair of shoulders 227 that lie adjacent to a pair of shoulders 228 of a recess that receives the projection. The shoulders circumferentially abut to prevent circumferential movement, or rotation, of the ferrule about the axis 226. In FIG. 13, the slot 230 has a tapered upper part 240 to allow removal of the terminus by moving it upward only a small distance.

FIG. 18 shows the terminus 164 moved rearwardly R1, or upwardly until the spring 216 is "solid"; that is, all of the turns of the spring press against each other. The large diameter end 214 of the terminus rear body portion has been moved upwardly so the projections 220, 222 are clear of the walls of the passages 200 in the mount and of the recesses 224. The terminus 164 can be turned, and then released to allow the spring 216 to push the terminus forward into a locked position wherein the projections 220, 222 engage the walls of the recesses 224. The terminus is moved upwardly by pulling its upper end with a tool while two connectors are mated, or pushing up its lower end, such movement being done manually rather than automatically. It is noted that with the terminus moved upward to the position shown in FIG. 18, the terminus also can be moved through the slot 252 (FIG. 19) and out of the mount. It is noted that the optical cables with jackets around the fibers, usually can be turned at least 180° in either direction without difficulty, so turning of the terminus is generally not a problem.

A large number of devices can be used to prevent rotation of the terminus in a locked position, while allowing the terminus to be rotated to a different position and locked thereat. It is possible to rely on friction to hold the terminus in a particular rotational orientation, but this is generally not satisfactory, especially if the fiber cable has been twisted, because the fiber tends to rotate the terminus back to its initial position. For locking the terminus at any particular rotational position, it is necessary that shoulders on the terminus and on the walls of the passage that face at least partially circumferentially, abut one another to prevent rotation. This can be accomplished by projections on the terminus that project radially and/or axially to project into corresponding recesses in the passage, or projections on the passage walls that project into recesses formed in the terminus body. In most cases, movement to a release position requires sliding the terminus along its axis so the shoulders do not engage each other to prevent terminus rotation. It is also possible, although not preferred, to provide projections or recesses on the mount that withdraw from engagement with the terminus when an actuator is manually actuated, so the terminus does not have to be moved rearward to turn it. It is even possible to release the terminus and turn it 45° every time a button is manually depressed.

In order to obtain maximum coupling between two fiber tips which are coupled, a technician passes light from a first fiber to the second, measures the amount of light received by the second fiber as by detecting light falling on a photodetector, and notes the amplitude of the light. The technician then rotates one of the termini by perhaps 45°, by moving the terminus rearwardly to the release position, turning it, and then releasing it to move to the locked position. In some cases it is necessary to disconnect the connectors, but in most cases the rear end of the terminus can be pulled rearwardly either by hand or by a tool. The technician then measures the amplitude and continues to turn the terminus to different positions until maximum amplitude of transferred light is detected. The terminus is left in that position.

Thus, the invention provides a connector and a connector system that includes a pair of mating connectors, which enables changing of the orientation of a termini of one of the connectors to increase the effectiveness of light coupling between two coupled fibers. One of the pair of coupled termini can be released from a locked position, turned, and then locked in a new rotational position. This can be accomplished by providing projections and recesses, one in the terminus and the other in the walls of the passage that receives the terminus, with the projections and recesses not engaged when the terminus is pulled rearwardly against the force of a spring that later returns it to a locked position. The terminus is accurately oriented in its corresponding frame by providing corresponding conical surfaces on the terminus and on the passage walls that lie facewise against each other.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector for holding at least one optical fiber, including a frame having a mount with an edge and opposite front and rear end portions and a through passage extending between said opposite end portions, said passage having an axis, said connector including a terminus having a body lying in said passage and having a ferrule extending forward of said body, said body and ferrule having aligned bores for holding an optical fiber, said terminus including a spring urging a body rear end against said mount rear portion, wherein:

said mount has a slot of predetermined width extending perpendicular to said axis from said edge to said passage, to enable movement of said terminus into and out of said mount;

said mount has walls forming a depression in its rear end portion, said depression having a greater width than said slot width and said depression forming a rear portion of said passage and merging with said slot, and said body rear end forms a nesting portion that nests in said depression under the force of said spring, said walls forming a depression forming shoulders (231) at sides of said depression that merger with said slot, said shoulders facing at least partially toward said passage axis to prevent said body from moving out of said slot so long as said spring presses said body nesting portion forwardly into said depression;

said walls forming a depression form a depression of round shape that extends more than 180° around said passage axis, said depression having a plurality of grooves at a periphery of said round shape, said grooves being uniformly angled around a center of said round shape, except that at least one of said grooves is missing due to the presence of said slot;

said body nesting portion has at least two projections for lying in said grooves, with one of said projections lying in said slot in one rotatable position of said body relative to said mount.

2. First and second optical fiber connectors that hold and couple optical fibers, said connectors including first and second frames that each includes a mount with a passage having front and rear ends, said connectors including first and second termini that each has an axis and a front end forming a ferrule and a rear end wherein an optical fiber-holding bore extends between said ends, each terminus lying in one of said passages, said connectors including an alignment sleeve with each ferrule having a front and lying in said alignment sleeve, and said connectors including a spring that presses said ferrules together and that presses said first terminus toward the mount of said first frame, wherein:

each of said ferrules has a rounded convex front end, and said alignment sleeve holds front ends of said bores on a sleeve axis (52) and in precise alignment so the passage of light between said optical fibers is increased more by having tips of the fibers touch than by more precise alignment of said fibers perpendicular to said axis;

said first terminus and said mount of said first frame are constructed to fix the rotational position of said terminus at a selected one of a plurality of fixed rotational positions about said terminus axis, to allow said first terminus and the convex face of its ferrule to be turned about said axis to one of said selected positions at which said fiber tips touch one another.

3. The connectors described in claim 2 wherein:

each of said mounts has an edge and has a slot extending from the edge to the passage of the mount, to enable movement of the terminus into and out of the mount;

each of said mounts has walls forming a depression in its rear end and each terminus has a nesting portion that nests in the depression, said walls forming a depression forming shoulders (231) at sides of said depression that merge with said slot, said shoulders facing at least partially toward said passage, to prevent said terminus from moving out of said slot so long as said spring presses said terminus forwardly into said depression.

4. The connector described in claim 2 wherein:

said ferrule front ends are each curved about a center that is intended to lie on the axis of the corresponding bore and that each lies precisely along said bore axis but with a slight error which spaces the center from said bore axis.

* * * * *